Patented Dec. 9, 1941

2,265,205

UNITED STATES PATENT OFFICE 2,265,205

INSECTICIDAL COMPOSITIONS

Frank B. Smith and Harold W. Moll, Midland, Mich., assignors to The Dow Chemical Company, Midland, Mich., a corporation of Michigan No Drawing. Application December 5, 1939, Serial No. 307,655

9 Claims. (Cl. 167—33)

This invention relates to insecticides, and is particularly concerned with compositions comprising phenothioxin derivatives as active toxicants.

The metal arsenates, such as those of lead, magnesium, and calcium, have long been employed as stomach poisons for inclusion in agricultural spray materials. Arsenical residues deposited in and on fruits and vegetables have proven hazardous to humans to such an extent that the use of the arsenates has been appreciably curtailed. Legislation regulating such residues has necessitated treatments for residue removal which greatly increase the ultimate cost of pest control. A further disadvantage in the use of many of the arsenates is that in combination with lime sulphur they react to form compounds which cause severe foliage injury. Acid lead arsenate also reacts with oil emulsions to such an extent that they are rendered unstable and injurious to growing vegetation. In view of the foregoing, the development of new stomach poisons for insect pests becomes of increasing importance.

We have discovered that phenothioxin-oxide and dioxide and the monochloro- derivatives thereof are effective stomach poisons and may be substituted for the arsenates in insecticidal compositions for the control of chewing insects. These compounds have the formula

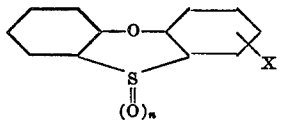

wherein X represents chlorine or hydrogen, and $n$ is 1 or 2. The oxides and dioxides as described above are relatively non-toxic to humans, are at least as effective as the arsenates, and have the added advantage of being compatible with such insecticidal materials as oil sprays and lime sulphur, neither of which can be satisfactorily employed with acid lead arsenate.

Phenothioxin-10-oxide may be prepared by oxidizing phenothioxin with nitric acid in glacial acetic acid solution. This compound is a white, crystalline material, melting at 154°–155° C. It is somewhat soluble in most common organic solvents, but substantially insoluble in water. Phenothioxin-10-dioxide may be prepared by oxidizing phenothioxin with hydrogen peroxide in glacial acetic acid or acetic anhydride solution. This compound is a white crystalline solid, melting at 147.5° C., substantially insoluble in water, and somewhat more soluble in common organic solvents than is the oxide. The corresponding oxides and dioxides of the chloro-substituted phenothioxins have similar characteristics and may be prepared in an analogous manner. A representative compound, 3-chloro-phenothioxin-10-oxide, is a crystalline compound, melting at 162° C. 3-chloro-phenothioxin-10-dioxide is a solid, melting at 159.5° C. All of the foregoing compounds are stable to light and air, and not appreciably affected by carbon dioxide.

These compounds are particularly valuable as constituents of insecticidal compositions which are to be contacted with growing vegetation. Their low water solubility, high melting point, stability, and low vapor pressure result in an extended residual toxicity against insect pests and minimum foliage injury for compositions in which they are employed.

The compounds as set forth above may be compounded with various inert carriers, such as diatomaceous earth, bentonite, talc, sulphur, wood flours, inorganic phosphates, or lime, to form agricultural dusts adapted to be applied in standard dusting equipment. If desired, such dusts may be employed as concentrates and subsequently diluted with water or other liquid carrier to form sprays. The compounds may also be incorporated with various wetting, dispersing, and sticking agents to form compositions which may be diluted to produce dust or spray materials in which the phenothioxin-oxide or dioxide compound is present in any desired concentration. In the preparation of concentrates, from about 5 to about 95 per cent by weight of the phenothioxin derivative is commonly employed in the composition. The concentration of the toxicant in dilute spray or dust compositions is preferably between about 0.2 per cent and 5 per cent by weight. The type of composition in which the phenothioxin compound is employed and the concentration thereof are dependent upon the type of insect to be controlled and the circumstances under which such control is to be accomplished.

In other embodiments of the invention, the phenothioxin- or chloro-phenothioxin-oxide or dioxide may be employed as a toxicant dissolved in the oil phase of an oil-water emulsion. Our new toxicants may also be employed in water suspension with or without an additional emulsifying, wetting, or dispersing agent. Likewise, they may be incorporated in other common insecticidal compositions, either as the sole toxic ingredient thereof or in combination with such materials as inorganic pigments, organic dyes, acid lead arsenate, lime sulphur, pyrethrum, rotenone, organic thiocyanates, sulphur, copper sprays, and the like.

The several examples are illustrative with respect to the particular compounds, composition types, and concentrations employed, but are not to be construed as limiting the invention.

Example 1

20 parts by weight of phenothioxin-10-dioxide was dissolved in acetone and the resulting solution employed to wet 80 parts by weight of diatomaceous earth. This mixture was air-dried to evaporate off the acetone, and thereafter ground in a ball mill until a relatively homogeneous composition was obtained having a maximum particle size of from 1 to 3 microns in diameter. The ground material was employed as a concentrate in the preparation of spray compositions which were applied for the control of various chewing insects.

10 pounds of the foregoing composition containing 2 pounds of toxicant was dispersed in sufficient water to produce 100 gallons of spray. The resulting dispersion was applied for the control of fall web worms (3d and 4th instar) and found to kill 95 per cent of the larvae. Acid lead arsenate at a concentration of 3 pounds per 100 gallons was effective against 80 per cent of the same insects in an analogous test.

Similarly, 15 pounds of the concentrate was made up to 100 gallons and applied to potato vines infested with Colorado potato beetle larvae (medium instar). This spray composition killed 100 per cent of the beetle larvae in 2 days. At a concentration of 3 pounds per 100 gallons of spray composition, acid lead arsenate was effective against 70 per cent of the beetle larvae.

In analogous determinations, the concentrate at 15 pounds in 100 gallons of spray was found to kill 100 per cent of the walnut worm (5th instar) and 60.8 per cent of the codling moth larvae in 5 days.

Example 2

In a similar manner, an insecticidal concentrate was prepared consisting of 20 parts by weight of phenothioxin-10-oxide and 80 parts by weight of diatomaceous earth. At a concentration of 15 pounds per 100 gallons, this composition gave 100 per cent control of Colorado potato beetle larvae in 2 days. In a check determination, acid lead arsenate at 3 pounds per 100 gallons was effective against 70 per cent of the beetle larvae.

Against fall web worm larvae, the spray material comprising 3 pounds of the oxide per 100 gallons was 95 per cent effective, while acid lead arsenate at 3 pounds per 100 gallons controlled 80 per cent of the larvae. The aqueous dispersion comprising the phenothioxin-10-oxide was 100 per cent effective against walnut worm. Against southern army worm (5th instar), the composition was the exact equivalent of acid lead arsenate, each toxicant being effective to the extent of 60 per cent within 3 days after application at a concentration of 3 pounds in 100 gallons.

Example 3

A composition was prepared by grinding together 86.2 parts by weight of phenothioxin-10-oxide, 7.7 parts of soy flour, 6.5 parts of dried sulphite waste liquor (Goulac), and 0.1 part of a mono-butyl phenylphenol sodium monosulphonate. 3.25 pounds of this composition, comprising substantially 3 pounds of the phenothioxin-10-oxide was dispersed in sufficient water to produce 100 gallons of spray and applied to potato vines badly infested with the larvae of the Colorado potato beetle (small and medium instar). After 2 days, 98 per cent of the beetle larvae were dead. In a control experiment, acid lead arsenate at 3 pounds per 100 gallons was found to give a kill of 98 per cent.

Example 4

Mixtures of 20 parts by weight of 3-chloro-phenothioxin-10-dioxide with 80 parts by weight of diatomaceous earth, and 20 parts by weight of 3-chloro-phenothioxin-10-oxide with 80 parts by weight of diatomaceous earth were prepared substantially as described in Example 1. At 15 pounds per 100 gallons of aqueous spray, each of these compositions was 100 per cent effective against walnut worms and the full equivalent of acid lead arsenate at 3 pounds per 100 gallons.

Other modes of applying the principle of our invention may be employed instead of those explained, change being made as regards the materials or their amounts employed, provided the ingredients stated by any of the following claims or their equivalent be employed.

We therefore particularly point out and distinctly claim as our invention:

1. An insecticidal composition comprising as an active toxicant a compound having the formula

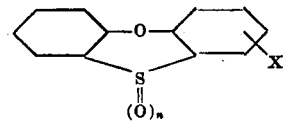

wherein X represents a member of the group consisting of chlorine and hydrogen, and $n$ is an integer not greater than 2.

2. An insecticidal composition comprising an intimate mixture of diatomaceous earth with a compound having the formula

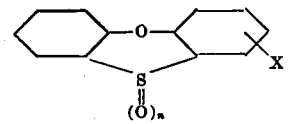

wherein X represents a member of the group consisting of chlorine and hydrogen, and $n$ is an integer not greater than 2.

3. An insecticidal spray composition comprising as an active toxicant a compound having the formula

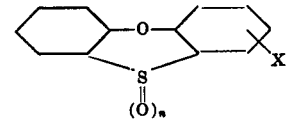

wherein X represents a member of the group consisting of chlorine and hydrogen, and $n$ is an integer not greater than 2.

4. An insecticidal composition comprising as an active toxicant a compound having the formula

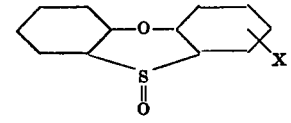

wherein X is a member of the group consisting of chlorine and hydrogen.

5. An insecticidial composition comprising as an active toxicant a compound having the formula

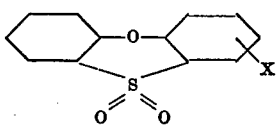

wherein X is a member of the group consisting of chlorine and hydrogen.

6. An insecticidal composition comprising as an active toxicant a compound having the formula

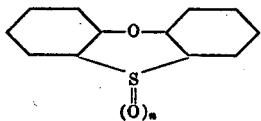

wherein $n$ is an integer not greater than 2.

7. An insecticidal composition comprising as an active toxicant phenothioxin-10-oxide.

8. An insecticidal composition comprising as an active toxicant phenothioxin-10-dioxide.

9. An insecticidal composition comprising as an active toxicant a compound having the formula

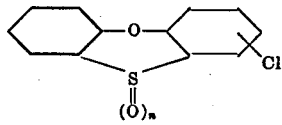

wherein $n$ is an integer not greater than 2.

FRANK B. SMITH.
HAROLD W. MOLL.